Nov. 12, 1935.  M. MILLER  2,020,614
APPARATUS FOR TRUING THE WHEELS OF MOTOR VEHICLES
Filed July 30, 1932  3 Sheets-Sheet 1
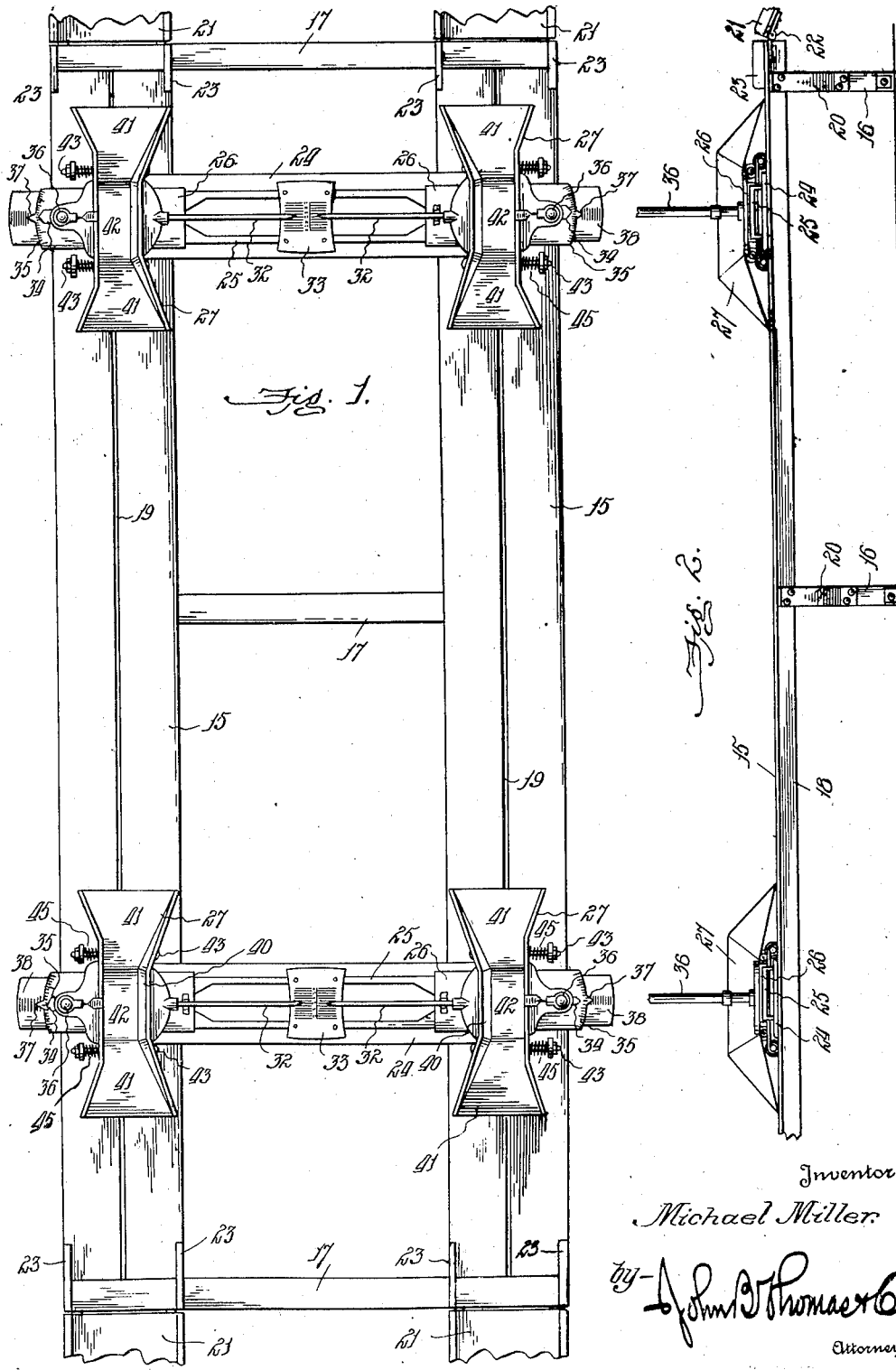
Inventor:
Michael Miller
by John B Thomas & Co.
Attorneys.

Nov. 12, 1935.  M. MILLER  2,020,614
APPARATUS FOR TRUING THE WHEELS OF MOTOR VEHICLES
Filed July 30, 1932   3 Sheets-Sheet 2
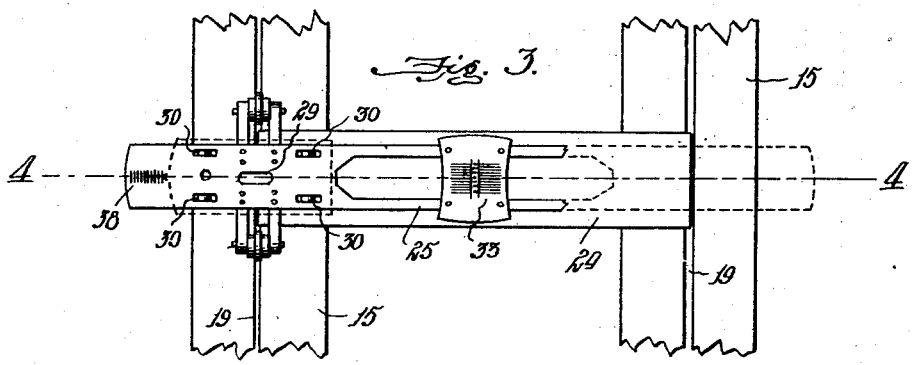
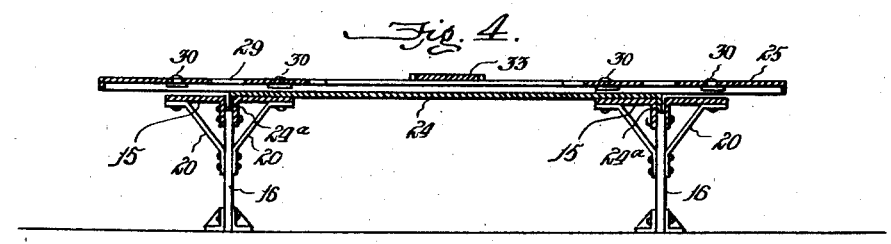
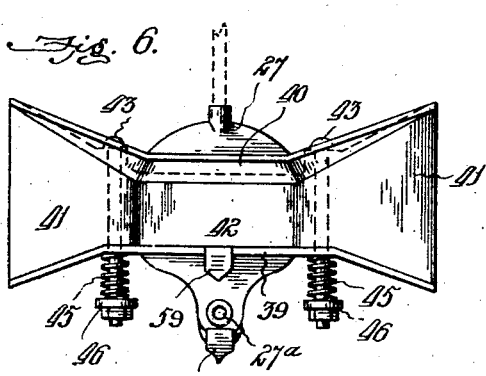
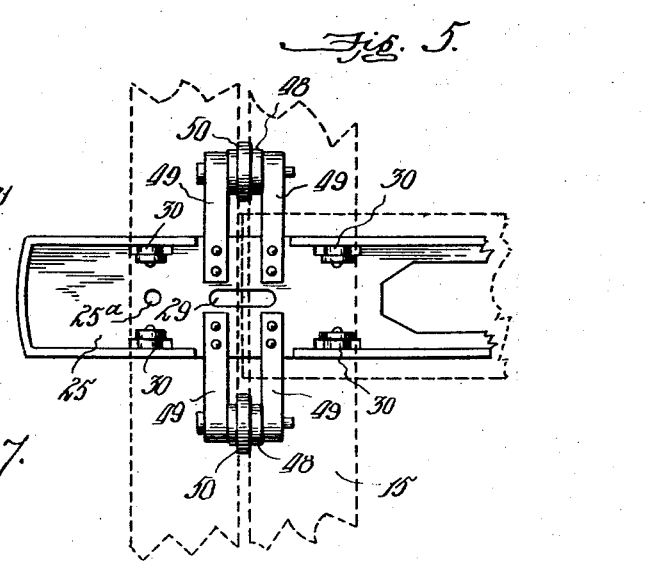
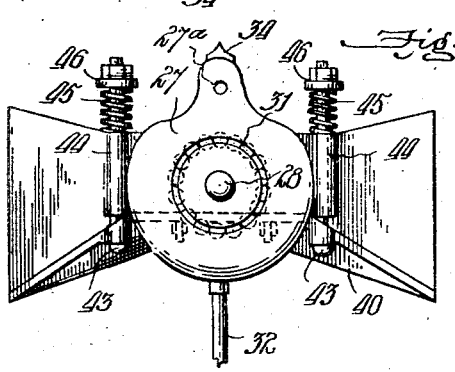
Inventor:-
Michael Miller.

Nov. 12, 1935.  M. MILLER  2,020,614
APPARATUS FOR TRUING THE WHEELS OF MOTOR VEHICLES
Filed July 30, 1932   3 Sheets-Sheet 3
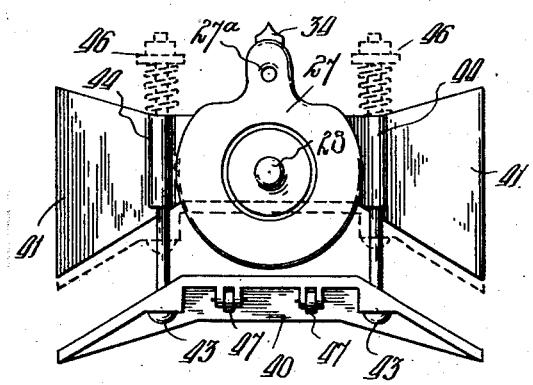
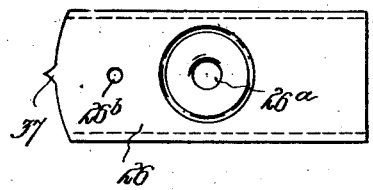
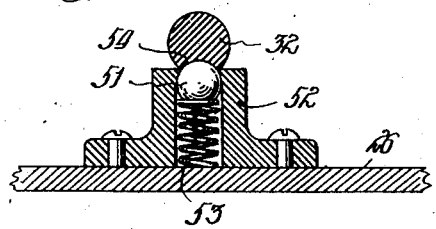
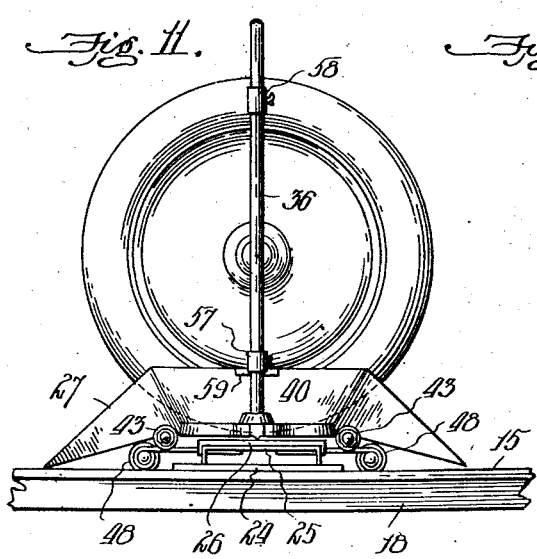
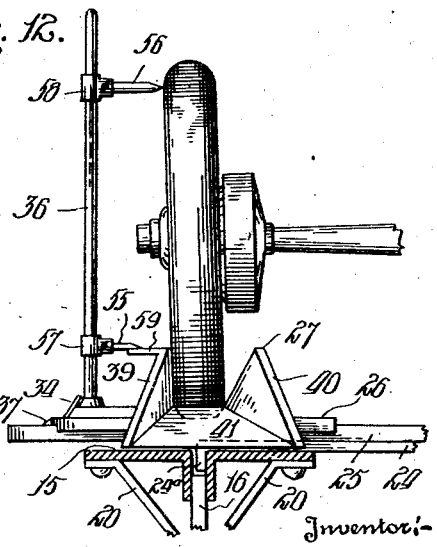
Inventor:-
Michael Miller.
By John B. Thomas & Co.
Attorneys Patented Nov. 12, 1935

2,020,614

UNITED STATES PATENT OFFICE 2,020,614

APPARATUS FOR TRUING THE WHEELS OF MOTOR VEHICLES

Michael Miller, Trenton, N. J.

Application July 30, 1932, Serial No. 627,057

8 Claims. (Cl. 33—203)

My invention relates to apparatus for adjusting or truing the wheels of motor vehicles, and the novel features of construction forming the subject matter of this application are improvements on the apparatus for a similar purpose described and claimed in my copending application filed June 5, 1931, Serial No. 542,445.

The object of my present invention is to provide an apparatus of this general character comprising a table or elevated runways on which swivelled blocks with upstanding walls for receiving the wheels are mounted for the convenience of the mechanic in making any required adjustments of the wheels or performing other work at the under side of the vehicle, and in order that the wheels may be adjusted with respect to camber as well as alignment my invention contemplates certain devices cooperating with the swivelled blocks for the purpose.

A further object of my present invention is to adapt the swivelled blocks for receiving between the upstanding walls thereof wheels having tires of different widths, for which purpose one of the walls of each block is movable and spring actuated towards the opposite wall, the lateral movement of the blocks cooperating with the movable walls in properly positioning the wheels on said blocks so that the alignment of the wheels of the vehicle and camber of each wheel may be ascertained preliminary to any adjustments thereon or during the operation of truing the wheels.

With these principal objects in view my invention consists in the construction and arrangement of parts embodying the improvements hereinafter particularly described and more specifically set forth in the appended claims.

In the accompanying drawings:

Figure 1 is a plan view of an apparatus for aligning wheels constructed in accordance with my invention.

Fig. 2 is a side elevation.

Fig. 3 is a detail plan view illustrating the means for supporting the swivelled blocks on the table or spaced apart runways.

Fig. 4 is a sectional view on the line 4—4 of Fig. 3.

Fig. 5 is an enlarged bottom plan view of one end of the platform supporting the swivelled blocks.

Figs. 6 and 7 are top and bottom plan views respectively of one of the swivelled blocks.

Fig. 8 is a bottom view of the swivelled block showing the connection of the movable wall thereto.

Figs. 9 and 10 are detail views of the laterally movable carriage.

Figs. 11 and 12 are elevational views illustrating the attachments for indicating the camber of the wheels, and Fig. 13 is a detail view of a stop for positioning the blocks in longitudinal alignment.

In carrying out my invention the table is in the form of spaced apart raised tracks or runways 15, 15, supported at the desired elevation by posts 16 and connected by crosspieces 17, each track or runway comprising longitudinal plates or beams having downwardly projecting flanges 18 at the inner edges thereof slightly separated to leave narrow channels 19, the supporting of the plates or beams being reinforced by diagonal braces 20 extending from the posts to near the outer edges of said plates or beams. Leading from the ground to the ends of the tracks or runways are ramps 21 connected by hinge 22, said ramps having upstanding side pieces on a line with guard plates 23 at the ends of the track, and to support the devices for adjusting the alignment and camber of the wheels at the front and rear of the vehicle so as to accommodate any variation in wheel base movable bridge plates 24 are mounted on the tracks or runways, said bridge plates having downwardly turned outer ends 24a slidable in the channels 19 between the plates of the tracks or runways.

The mechanism for ascertaining the alignment of the wheels at the front and rear of the vehicle is similar to that shown and described in my prior application referred to; that is to say it comprises a platform 25 extending across the tracks or runways near each end thereof and supported at its ends thereon, with carriages 26, 26 slidable on the end portions of the platform and having swivelled blocks 27, 27 mounted thereon, each block being connected to the carriage by a center pin 28 passing through opening 26a in said carriage and through a slot 29 in the platform, whereby lateral movement of the blocks towards and away from each other is permitted to accommodate the tread of the wheels. To reduce friction between the carriages and the platform on which they are mounted rollers 30 are journaled in the platform (see Fig. 3), while to reduce friction between the blocks and carriages ball bearings 31 are provided located on the under side of the block as shown in Fig. 7. I also provide the blocks with inwardly projecting pointers 32 extending over the platform towards the center thereof to cooperate with a dial 33 in determining the longitudinal alignment of the blocks and wheels supported thereon, with a second set of pointers 34 at the outer side of each block moving over a dial 35 at the outer end of the carriage. For temporarily holding the blocks while the wheels of the vehicle are being run thereon a coupling pin is passed through holes in the projecting portion of the block and carriage, said coupling pin being in the form of an ordinary coupling pin (not shown) or vertical rod 36 constituting part of the means hereinafter described for adjusting the camber of the wheel. Furthermore, to ascertain the adjustment of the blocks with respect to the tread of the vehicle the outer ends of the carriages 26 are each provided with a pointer 37 cooperating with a scale plate 38 at the outer end of the platform on which the carriages move, and this scale is also employed in the adjustment of camber, as hereinafter described.

The blocks 27 which receive the wheels of the vehicle in adjusting their alignment and camber are formed with vertical walls 39 and 40 at opposite sides thereof, and said walls are flared outwardly where the ends of the block extend downwardly to provide inclined ways or ramps 41 leading to a depressed seat 42 at the center of the block, one of said side walls, as 39, being perpendicular while the other, 40, is inclined inwardly from top to bottom. In order that said walls may automatically adjust themselves to the width of tire on the wheel to be adjusted one of said walls, preferably the inner wall 40, is separate from the block and movable or adjustable laterally. As shown in Figs. 6 and 7 wall 40 is connected to the under side of the block by means of headed bolts 43 extending through the lower end of the wall and through elongated lugs 44 at the under side of the block, said bolts projecting beyond the ends of the lugs opposite the movable wall to receive strong helical springs 45 interposed between the block and a nut 46 threaded on the outer end of the bolt, whereby the spring will actuate the movable wall to clamp the tire of the wheel between the walls 39, 40 to properly position said wheel on the block in ascertaining the alignment and camber.

The movable wall of the block is provided with rollers 47 at the lower end thereof resting on the base portion of the block, so that said wall may have a free sliding movement laterally for clamping the tire of the wheel between the walls; it being understood that the block and carriages supporting the same also have lateral movement on the platform for the required clamping action of the movable wall as well as for automatic adjustment as to the tread of the companion wheels of the motor vehicle.

The apparatus provides for operating on all four wheels of the motor vehicle, and for adjusting the platforms to accommodate the wheel base said platforms are provided with rollers 48 bearing in straps 49 bolted to the under side of the platform, the depending flanges of said platform being cut away as shown in Fig. 5 to accommodate the straps, and to prevent sidewise movement of the platform with respect to the elevated tracks or runways the aforesaid rollers are provided centrally with peripheral flanges 50 travelling in the channels 19 in the tracks.

In adjusting the alignment of the vehicle wheels a spring-actuated ball-stop 51 is located on the carriage at the inner side of each block to be engaged by pointer 32, said stop device consisting of a metal bracket 52 recessed to receive a spring 53 bearing against the under side of ball 51, which latter slightly projects beyond the upper end of the metal bracket to engage a concaved recess 54 in the under side of the pointer.

For adjusting the camber of a wheel of the automobile the vertical rod 36 is employed, said rod being provided with pointers 55 and 56 attached to the rod by means of adjustable sleeves 57 and 58 respectively, the pointer 55 cooperating with a scale plate 59, extending outwardly from the upper edge of the vertical wall 39 of the block while the pointer 56 is located near the upper end of the rod to contact with the upper part of the tire, as shown in Fig. 12. As will be noted the devices for adjusting the camber of the wheel cooperate with the devices for adjusting the alignment, and consequently these operations may be performed on all four wheels when the motor vehicle is driven on to the tracks and blocks so as to be seated in the latter.

For adjusting the camber of the wheel the inclined movable wall 40 presses the wheel or tire resting in the depressed seat of the block against the vertical wall 39 and the pointers 55 and 56 will indicate the camber, for which purpose pointer 55 travels over the scale plate 59, that is to say, when the wheel is clamped against the vertical wall 39, the upper edge of which bears against the tire by extending across the lower portion thereof as illustrated in Fig. 11, the camber or inclination of the wheel is ascertained by the length of the removable pointer 56 extending from the upper end of the perpendicular rod 36, with the companion removable pointer 55 merely indicating the camber on the scale 59. In this operation the scales 38 at opposite ends of the platform, in conjunction with the pointers 37 on the carriages show the tread of the wheels.

In the operation for determining the alignment of vehicle wheels the automobile is run by way of the tracks on to the swivelled blocks so that the wheels will rest in the depressed seats at the center thereof, with the walls of said blocks engaging the opposite sides of the tire for turning movement of the blocks in assuming the alignment of the wheel, and of course the pointers extending from the inner and outer sides of each block will indicate whether or not the wheel is out of alignment and if so to what extent. In case any wheel is out of alignment or toed in or out it may be adjusted while on the turnable block until the indicators 32, 33 and 34, 35 point to zero, after which the said wheel may be also adjusted with reference to the camber desired. The present invention therefore provides for truing the wheels of motor vehicles both as to alignment and camber, and the several devices being mounted on raised tracks permits the mechanic easy access to the parts requiring these adjustments as well as for any other work at the under side of the body of the vehicle.

I claim:—

1. An apparatus for truing the wheels of motor vehicles comprising a pivotally supported block having spaced apart walls between which the wheel is clamped, and means whereby one of said walls is spring actuated towards the opposite wall to accommodate tires of different widths and position the wheel in alignment with the block; together with means for indicating the position of the block.

2. An apparatus for truing the wheels of motor vehicles comprising a pivotally supported block having walls between which the wheel is confined, one of said walls being perpendicular and the other inclined, and means for connecting one of the walls to the block for movement of the same with respect to the companion wall, said means comprising bolts connecting the movable wall to the block, and springs on the bolts to press said wall for yielding movement of the latter in accommodating wheel tires of different widths.

3. An apparatus for truing the wheels of motor vehicles comprising spaced apart raised tracks having longitudinal channels, slidable bridge plates extending across the tracks and having downwardly turned ends slidable in the channels, platforms mounted on the bridge plates and adjustable therewith to correspond with the wheel base of the vehicle to be operated upon, blocks swivelled on the platforms for alignment with the wheels, and means on the blocks and their supports for indicating the turning movement of said blocks.

4. An apparatus for truing the wheels of motor vehicles comprising a pivotally supported block, walls at opposite sides thereof between which the wheel is confined so that said block will correspond to the alignment of the wheel, one of said walls being perpendicular and the other inclined outwardly, and means whereby one of said walls is spring-actuated towards the opposite wall to accommodate tires of different width; together with means for indicating the position of the block.

5. An apparatus for truing the wheels of motor vehicles comprising spaced apart raised tracks having longitudinal channels, bridge plates extending across the tracks and having downwardly turned ends slidable in the channels, said bridge plates being movable on the tracks for the spacing thereof in accordance with the wheel base of the motor vehicle to be operated upon, swivelled blocks carried by the bridge plates and having opposite side walls between which the wheel is confined, and means for indicating the turning movement of said blocks relative to the supports on which they are mounted.

6. An apparatus for truing the wheels of motor vehicles comprising raised tracks having longitudinal channels, platforms movable on the tracks longitudinally for the spacing thereof in accordance with the wheel base of the motor vehicle, rollers supporting the platforms on the tracks and having peripheral flanges engaging in the channels of the tracks, swivelled blocks movable on the platforms to accommodate the tread of the wheels, and spaced apart walls on each block between which a wheel of the vehicle is confined; together with means for indicating the turning movement of said blocks relative to the supports on which they are mounted.

7. An apparatus for truing the wheels of motor vehicles comprising raised tracks, platforms movable on the tracks longitudinally for the spacing thereof in accordance with the wheel base of the motor vehicle to be operated upon, blocks mounted on the platforms, means for supporting said blocks for rotatable movement, means for permitting lateral movement of the blocks in accordance with the tread of the wheels, and spaced apart walls at opposite sides of each block between which a wheel of the vehicle is confined; together with means for indicating the turning movement of said blocks relative to the supports on which they are mounted.

8. An apparatus for truing the wheels of motor vehicles comprising raised tracks, platforms movable on the tracks longitudinally for the spacing thereof in accordance with the wheel base of the motor vehicle to be operated upon, blocks swiveled on the platforms, means for supporting said blocks for lateral movement in accordance with the tread of the wheels, a perpendicular wall at one side of each block and a companion wall on said block laterally movable with respect to said perpendicular wall, and means for yieldingly holding the movable wall in normal position; together with means for indicating the turning movement of the blocks relative to the supports on which they are mounted.

MICHAEL MILLER.